United States Patent [19]

Evenwoll

[11] Patent Number: 4,503,424
[45] Date of Patent: Mar. 5, 1985

[54] PROTECTED SENSOR FOR GRANULAR MATERIALS

[75] Inventor: David L. Evenwoll, Pinewood, Minn.

[73] Assignee: Cargill, Inc., Minneapolis, Minn.

[21] Appl. No.: 310,436

[22] Filed: Oct. 13, 1981

[51] Int. Cl.$^3$ .......................................... G08B 21/00
[52] U.S. Cl. ................................. 340/617; 73/304 C; 324/61 P
[58] Field of Search ...................... 340/612, 616, 617; 324/61 P, 61 QS, 61 QL; 73/304 C

[56] References Cited

U.S. PATENT DOCUMENTS

| | | | |
|---|---|---|---|
| 1,164,882 | 12/1915 | Sommer | 340/616 |
| 2,316,875 | 4/1943 | Laboulais | 324/61 P |
| 2,774,959 | 12/1956 | Edelman et al. | 324/61 QS |
| 3,013,256 | 12/1961 | Damast | 324/61 QL |
| 3,879,644 | 4/1975 | Maltby | 73/304 C X |
| 4,208,909 | 6/1980 | Maltby et al. | 73/304 C |

OTHER PUBLICATIONS

Sales brochure—Turck MultiProx, Inc. entitled "Capacitive Proximity Switches".
Article entitled, "Capacitive Sensing" from Machine Design, May 15, 1980, pp. 304–305.
Sales brochure—Omron Electronics, Inc. entitled, "Proximity Sensor".
Sales brochure—Endress & Hauser, Inc. entitled, Vibratol "Electronic Level Control for Solids".
Sales brochure—National Soncis Corporation entitled "The Product Adviser".

Primary Examiner—James L. Rowland
Assistant Examiner—Daniel Myer
Attorney, Agent, or Firm—Fitch, Even, Tabin & Flannery

[57] ABSTRACT

An apparatus for detecting the presence of granular material at a predetermined location in conduit adapted to contain the flow of granular material and in containers adapted to store granular material, wherein the upper portion of a sensing terminal is embedded in a protective housing. The protective housing has a material deflecting surface formed thereon and the lower portion of the sensing terminal protrudes from the protective housing opposite the material deflecting surface. The sensing terminal is adapted to exhibit a change in at least one of its electrical characteristics when the lower portion is in communication with granular material. Means are provided for mounting the protective housing and sensing terminal in a predetermined orientation relative to the container or conduit wall so that the flow of granular material is substantially diverted away from the lower portion of the sensing terminal.

4 Claims, 7 Drawing Figures

PROTECTED SENSOR FOR GRANULAR MATERIALS

BACKGROUND OF THE INVENTION

1. Field of the Invention

The present invention relates generally to sensing apparatus used to detect the presence of granular material at a predetermined location in conduit adapted to contain the flow of granular material and in containers, such as hoppers, used to store granular material. More particularly, the invention relates to an electrical sensing terminal in such apparatus that is shielded by a protective housing to reduce the damaging effects of flowing and impinging granular material on the terminal.

2. Description of the Prior Art

Granular materials such as corn, barley and powdered metals and glasses are often stored in containers such as bins and hoppers that are usually equipped with a gate or valve actuated discharge throat. The granular material is frequently transported to and from the container through conduit using various means for propulsion such as pneumatic power, gravity feed and even pumping if the material is in the form of a slurry. Various sensing apparatus are used to indicate the level of granular material in the containers for inventory purposes, to locate "plugged material", and to control material input and discharge.

Heretofore, many sensing apparatus have been constructed that detect the presence of granular material by means of a "sensor" placed at a predetermined location in containers and conduit. As used herein the term "sensor" indicates that element of a sensing apparatus which is usually located in the proximity of the aforementioned predetermined location and contains a "sensing terminal" that is adapted to exhibit a response to communication with granular material. The response of the sensing terminal is generally monitored by means of known electrical circuitry. Five sensors widely used in sensing apparatus for granular materials may be generally classified as diaphragm, paddle, frequency vibration, ultrasonic and antenna types.

Diaphragm-type sensors are usually quite large and may measure as much as 8 inches on a side. Thus, they have the tendency to restrict material flow especially if mounted in a small diameter discharge throat. This type of sensor is also difficult to mount and requires bolting or welding to the container wall and must be frequently replaced when used in conjunction with abrasive or corrosive granular materials.

Paddle-type sensors have sensing terminals in the form of paddles or vanes that are adapted to stall when in contact with granular material. Paddle-type sensors may extend up to 6 inches into the container or conduit so they tend to restrict material flow when mounted in a narrow aperture such as a discharge throat and to wear rather quickly when used in conjunction with abrasive materials. Another disadvantage is that a large space on the exterior of the container is required to provide clearance for a paddle drive motor and associated electrical circuitry.

Frequency vibration- and antenna-type sensors have the drawback that they require sensitive electronic equipment that often breaks down when used in dusty, moisture laden or corrosive atmospheres. Also, a large space on the exterior of the container is needed to provide clearance for the electronic equipment.

Ultrasonic sensors generally employ sensing terminals in the form of two aligned ultrasonic transducers separated by a predetermined distance. Because it is critically important that the transducers remain aligned during operation, this type of sensor requires frequent adjustment. The delicate transducers do not readily withstand the abrasion caused by the flow of many granular products and may require a support arm which extends up to 10 inches into the container or conduit. Thus, they are also not readily adaptable for use in areas of restricted diameter such as discharge throats.

BRIEF DESCRIPTION OF THE INVENTION

The protected sensor of the invention is incorporated in sensing apparatus as used to detect the presence of granular material at a predetermined location in conduit, adapted for containing the flow of such material, and in containers used to store such material. In accordance with the present invention a sensing terminal having an upper and lower portion is provided. The sensing terminal is of the type adapted to exhibit a change in at least one of its electrical characteristics when the lower portion is in communication with granular material. In a preferred embodiment, the sensing terminal is provided in the form of a capacitive proximity sensor, the capacitance of which changes when in communication with granular material. The upper portion of the sensing terminal is embedded in an improved protective housing that is fabricated from a tough material such as urethane. At least one material deflecting surface is formed on the protective housing and the lower portion of the sensing terminal protrudes from the protective housing opposite the material deflecting surface. Known electrical control circuitry, operatively associated with the sensing terminal, measures the change in its electrical characteristic and produces a signal that can communicate material level or presence. The electrical control circuitry can be remotely located from the protected sensor by the use of electrical leads.

Means are provided for mounting the protected sensor at a predetermined location and in a predetermined orientation relative to the conduit or container. In a preferred embodiment, the mounting means are provided in the form of a mounting flange integrally joined to the protective housing. Mounting of the preferred protected sensor is done from the exterior of the container or conduit and may be performed while granular material is present therein. The protected sensor is adapted to be oriented in the container or conduit so that the abrasive flow of granular material may be substantially diverted away from the protruding lower portion of the sensing terminal by the material deflecting surface. Thus, the protective housing shields the sensing terminal from the damaging effects of the direct impingement of flowing granular material without substantially interfering with material flow.

Accordingly, a general object of the present invention is to provide a new and improved protected sensor for detecting the presence of granular material at a predetermined location in a container or conduit wherein the sensing terminal is shielded from the abrasive effects of flowing material by a protective housing.

Another object of the invention is to provide a new and improved protected sensor that does not require a large clearance on the exterior of the conduit or container.

Another object of the invention is to provide a new and improved protected sensor which can be mounted from the exterior of the container or conduit.

Still another object of the invention is to provide an improved protected sensor that does not substantially interfere with the overall flow or throughput of granular material.

These and other objects of the invention will become apparent from the following detailed description when taken with the accompanying drawings of which:

DETAILED DESCRIPTION OF THE INVENTION

Figure 1:
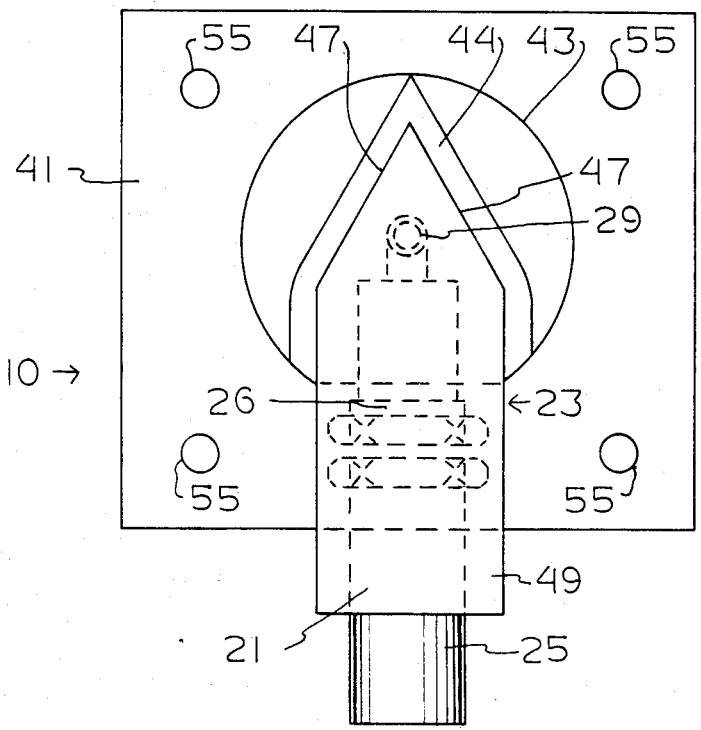
FIG. 1 is a front elevational view of a first embodiment of the protected sensor of the invention showing a protective housing having the upper portion of a sensing terminal in the form of a capacitive proximity sensor embedded therein.
Figure 2:
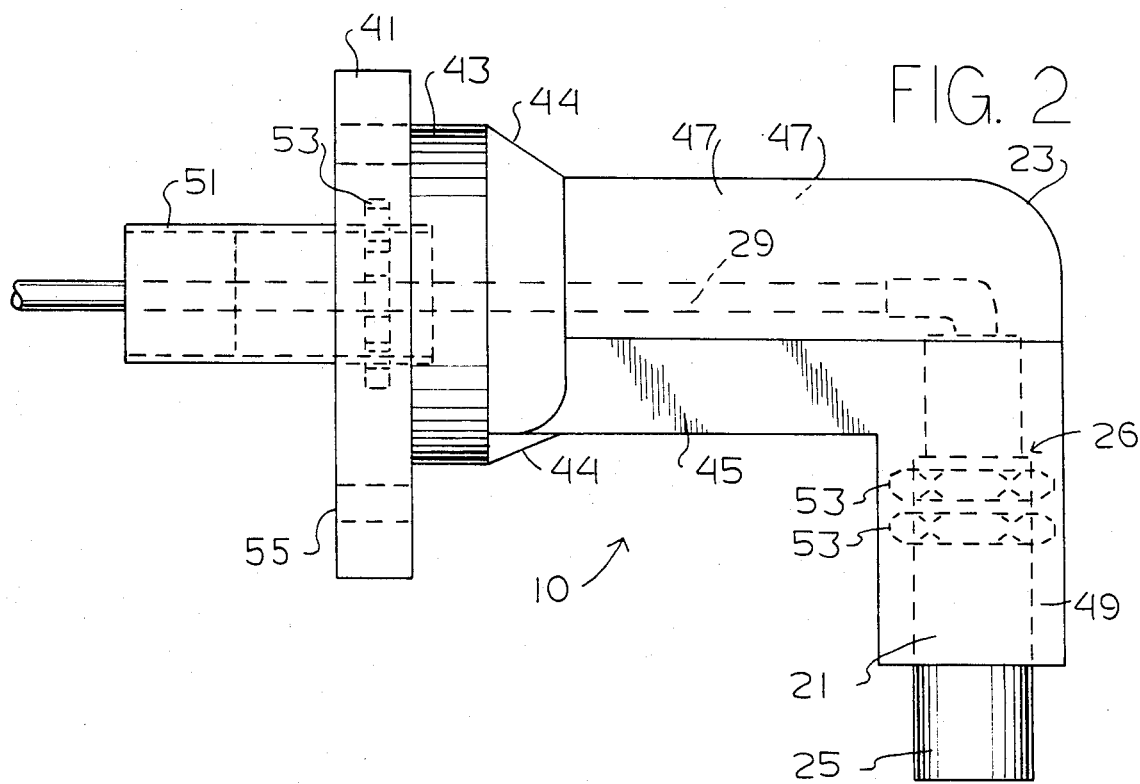
FIG. 2 is a side elevational view of the apparatus shown in FIG. 1.
Figure 3:
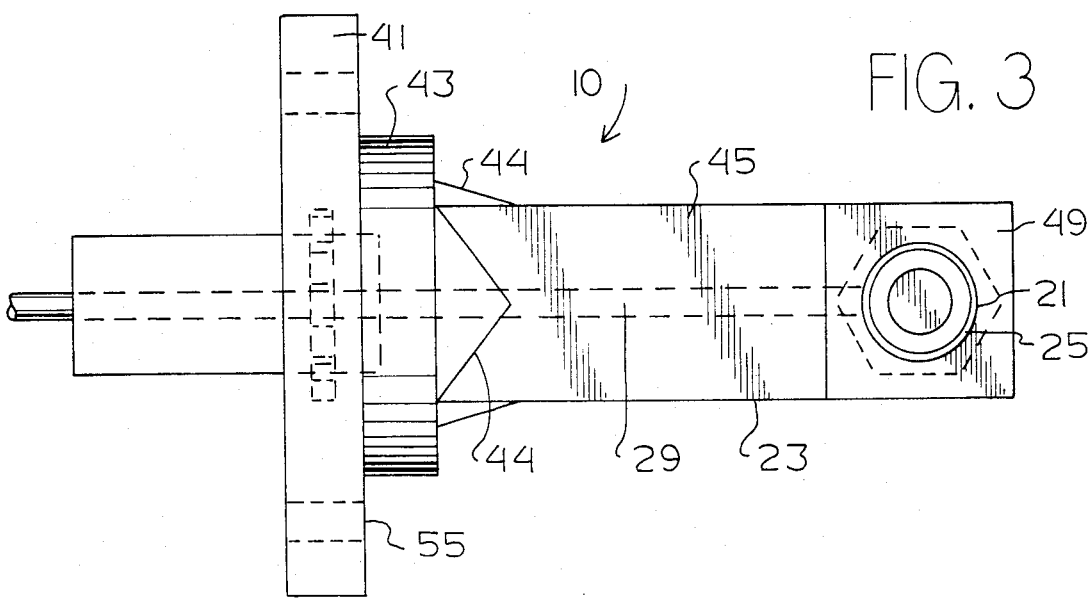
FIG. 3 is a bottom view of the apparatus shown in FIGS. 1 and 2.

Referring now to the drawings and in particular to FIGS. 1–3 there is illustrated a first embodiment of the protected sensor indicated generally by reference numeral 10. The protected sensor 10 includes a protective housing 23, and a sensing terminal 21 having an upper 26 and lower portion 25. The sensing terminal 21 is adapted to exhibit a change in at least one of its electrical characteristics when the lower portion 25 is in communication with granular material. The preferred sensing terminal 21 shown in the drawings is a capacitive proximity sensor adapted to exhibit a change in capacitance. Such sensors include models CJ1–12GK–N and CJ6–18GK–N which are available from Gould Inc., Distribution and Controls Division, Manufacturers of R. B. Denison Products, Bedford Ohio. The protective housing 23 is fabricated from a tough material such as urethane and has material deflecting surfaces 47 formed thereon. The upper portion 26 of the sensing terminal 21 is embedded in the protective housing 23 and the lower portion 25 protrudes therefrom, opposite the material deflecting surfaces 47. In a preferred embodiment of the invention means are provided for mounting the protected sensor 10 in a predetermined location and orientation in a container or conduit in the form of a mounting flange 41. The mounting flange 41 is integrally joined to the protective housing 23 and includes a locating ring 43 and a plurality of screw holes 55 adapted for affixing the protected sensor 10 to a container or conduit wall. Because the preferred sensing terminal 21 is provided in the form of a capacitive proximity sensor, the protective housing 23 includes a spacing arm 45 that is necessary to prevent the container or conduit wall from interfering its operation as will be explained hereinafter.

The overall shape of the protected sensor 10 is generally faucet-like. The protective housing 23 and mounting flange 41 are preferably molded as a single part from a tough material such as urethane. The urethane is molded around the upper portion 26 of the sensing terminal 21 and the adjacent portion of a two wire cable 29 which may be used to electrically associate a capacitive proximity sensor with other known circuit means exterior of the container or conduit. The two wire cable 29 runs the length of the spacing member 45 and exits through the rear of the mounting flange 41. Fillets 44 provide extra strength to the protective housing 23 and help prevent breakage in the event it is struck by a large or heavy object as could occur during filling of a container. A sensing terminal sleeve 49 is used to fix the length of the lower portion 25 of the sensing terminal 21 that protrudes from the protective housing. If the sensing terminal 21 is provided in the form of a capacitive proximity sensor, the lower portion 25 is preferably made to protrude between about $\frac{1}{2}$ and about $\frac{3}{4}$ of an inch. This length allows the lower portion 25 sufficient communication with the granular material to permit functioning yet minimizes its exposure to the abrasive effects of flowing granular material.

An optional sleeve 51 can be used to minimize stresses on the two wire cable 29 at its point of exit from the mounting flange 41. The sleeve 51 is about 2 inches in length and is easily fabricated from standard $\frac{1}{8}$ inch diameter pipe. By threading the sleeve at one end and affixing a burr nut 53, the sleeve 51 can be anchored in the protective housing 23 during molding. As can be seen in FIG. 2, the molding material is allowed to flow a short distance into the sleeve 51 to provide a more secure anchor.

The sensing terminal 21 is also anchored in the protective housing 23 through the use of burr nuts 53. Capacitive proximity sensors having threads already formed on their upper portions are commercially available. One such capacitive proximity sensor is manufactured by R. B. Denison Corp. of Bedford, Ohio.

Figure 4:
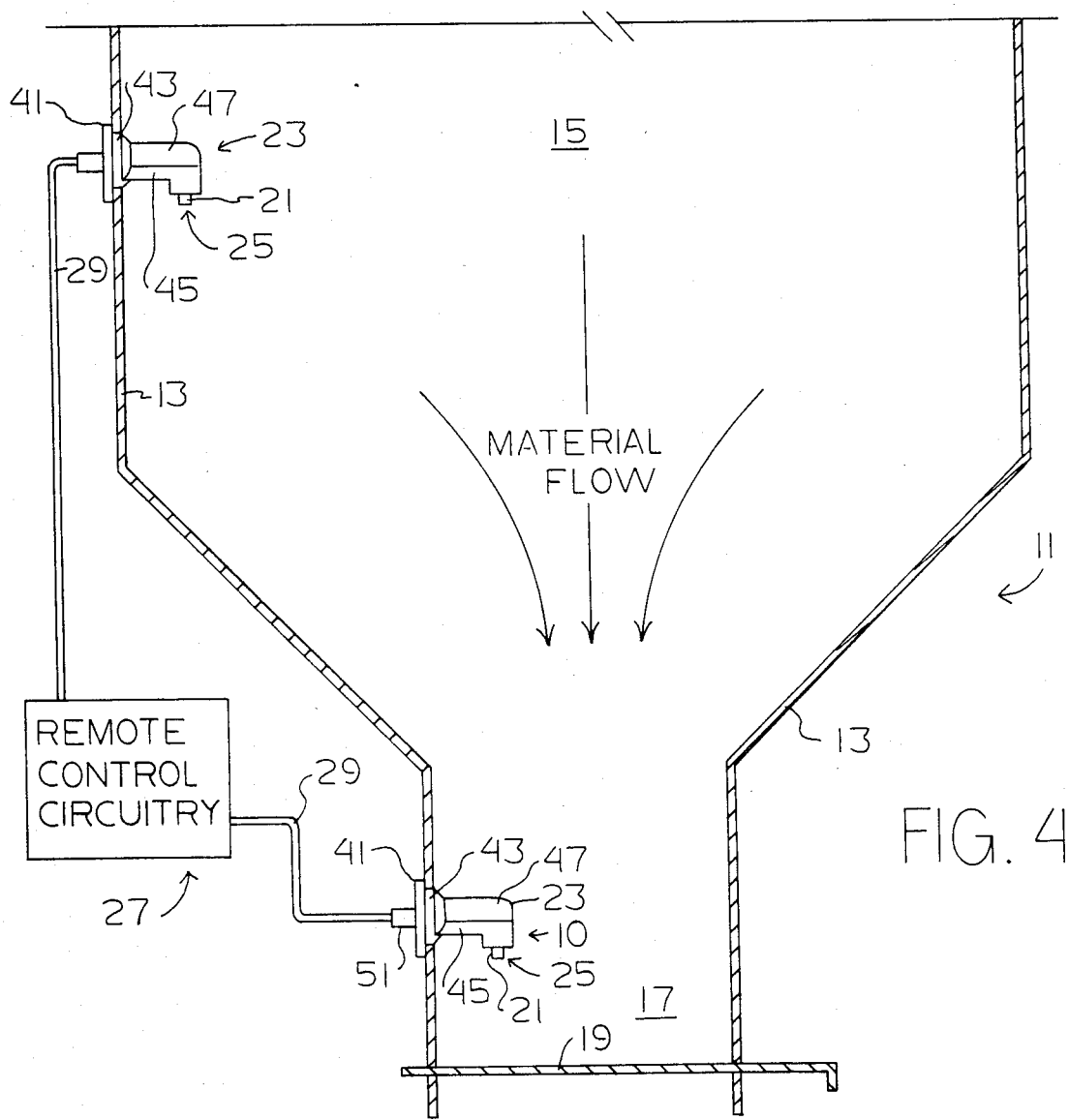
FIG. 4 is a schematic representation of a breakaway view of the lower portion of a grain bin having two of the protected sensors of the invention illustrated in FIGS. 1–3 mounted therein. Known circuit means, designated as remote control circuitry, is operatively associated with the sensing terminals.

By way of illustration, a grain bin 11 typical of the type of a container used to store corn, barley or wheat is shown in FIG. 4. The grain bin 11 generally has thin walls 13 fabricated from sheet metal that is formed to provide an upper storage compartment 15 and a lower discharge throat 17. The grain bin 11 is generally filled through a hatch (not shown) in the top of the storage compartment 15 and emptied by opening a gate 19 located at the bottom of the discharge throat 17. The flow of granular material in the bin during filling or emptying is generally in the direction of the large arrows shown in FIG. 4. A first protected sensor 10, is shown mounted in the grain bin 11 to the bin wall 13 in the area of the discharge throat 17.

The protected sensor 10 is mounted through a hole, corresponding in size to the locating ring 43 which is cut through the grain bin wall 13 at the desired location. The spacing member 45 and sensing terminal 21 are inserted through the hole into the grain bin 11. The mounting flange 41 is placed flush with the exterior of the grain bin wall 13 so that the locating ring 43 fits snuggly in the hole. The screw holes 55 in the mounting flange 41 (not shown in FIG. 4) permit the protected sensor 10 to be anchored to the grain bin wall 13 through the use of standard fasteners such as sheet metal screws. Mounting of the protected sensor 10 is easily accomplished even when granular material is present in the bin 11 because it is done from the outside.

When mounted, the protected sensor 10 is oriented in the grain bin 11 so that the lower portion 25 of the sensing terminal 21 is located downstream (in the direction of the material flow) from the material deflecting surfaces 47. Thus, the material deflecting surfaces 47 can substantially divert the impinging flow of granular material away from the exposed lower portion 25 of the sensing terminal 21 thereby reducing its abrasive effects. The peaked profile of the deflecting surfaces 47 shown in FIGS. 1 and 2 prevents the protective housing 23 from substantially interfering with the overall flow or throughput of granular material. It is, of course, apparent that other material deflecting surfaces, such as a single surface having a profile resembling an inverted "U", could perform the same function.

Known circuit means indicated in FIG. 4 as a remote control circuitry 27, is used to detect the change in the electrical characteristic of the sensing terminal 21, such as capacitance, when the lower portion 25 is in communication with granular material. The two wire cable 29 operatively associates the preferred sensing terminal 21 with the remote control circuitry 27 so that very little space is required on the exterior of the grain bin wall 13.

For many applications, a single protected sensor 10 located in the discharge throat 17 of a grain bin 11 will provide sufficient information. This is because grain bins and many other types of containers for granular materials are often filled with a known quantity of material to be completely discharged in a single operation. This generally occurs when batch mixing is done or when granular material is stored in truckload quantities for loading and shipping. Thus, for purposes such as inventory determination, communication of a simple bin-empty or bin-full condition, as would be reported by a single protected sensor 10 in the discharge throat 17, will suffice. If it is necessary to make a more accurate determination of the level of granular material in a bin, a plurality of protected sensors 10 may be mounted in various predetermined locations along the height of the bin wall 13 such as that shown in the upper storage compartment 15 of the grain bin in FIG. 4.

Figure 7:
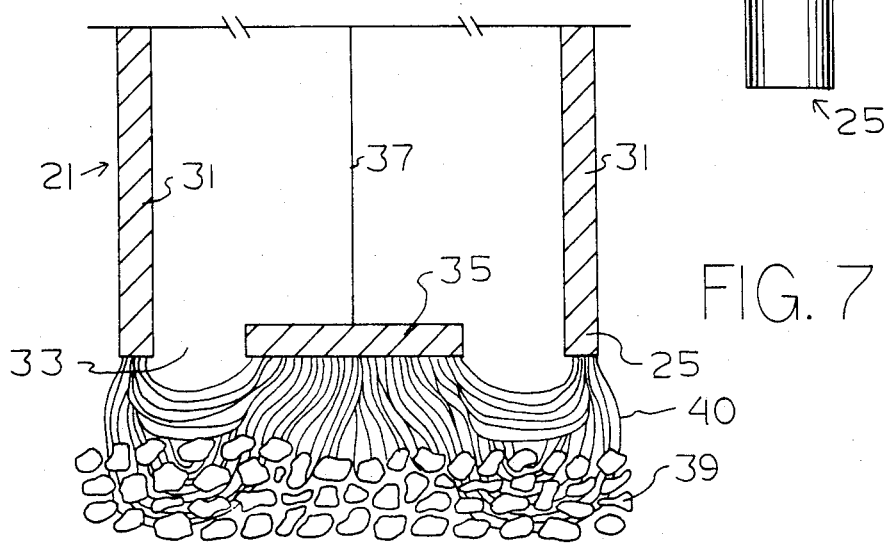
FIG. 7 is a schematic representation of a breakaway view of the lower portion of the preferred sensing terminal, a capacitive proximity sensor, as incorporated in the embodiments of the invention shown in FIGS. 1 through 6.

The operation of the preferred sensing terminal 21, a capacitive proximity sensor, is illustrated in FIG. 7. Only the lower portion 25 of the sensing terminal 21 that protrudes from the protective housing 23 is shown. The lower portion 25 of the sensing terminal 21 has a probe body 31 generally in the shape of a hollow cylinder having an opening 33 at one end. A generally disk-shaped sensor element 35 is located at the open end 33 of the probe body 31. An internal wire 37 extends from the sensor element 35 to the upper portion 26 (not shown in FIG. 7) of the sensing terminal 21 for connection with one wire lead of the two wire cable 29. The other wire lead of the two wire cable 29 is connected to the probe body 31. The known remote control circuitry 27 generates an alternating current in the two wire cable 29 thereby causing the probe body 31 and sensing element 35 to act as capacitor plates. As the granular material 39 (FIG. 7) approaches the opening 33 of the probe body 31, the strength of the electric field 40 created by the varying voltage of the probe body 31 and sensor element 35 is altered by virtue of the difference in the dielectric properties of the granular material 39 and air. Thus, a change in the capacitance of the sensing terminal 21 occurs when the lower portion 25 is in communication with the granular material 39. This change in capacitance is detected by the known remote control circuitry 27 which then communicates the presence of the granular material 39 generally at the point of the lower portion 25 of the sensing terminal 21.

Because other objects located near a capacitive proximity sensor can also cause a change in its capacitance, it is necessary that the preferred sensing terminal 21 be spaced an appropriate distance from the container or conduit wall. Thus, the length of the spacing arm 45 is important to the extent that a sensing terminal 21 in the form of a capacitive proximity sensor is preferably spaced approximately 6 inches from the container or conduit wall.

Figure 5:
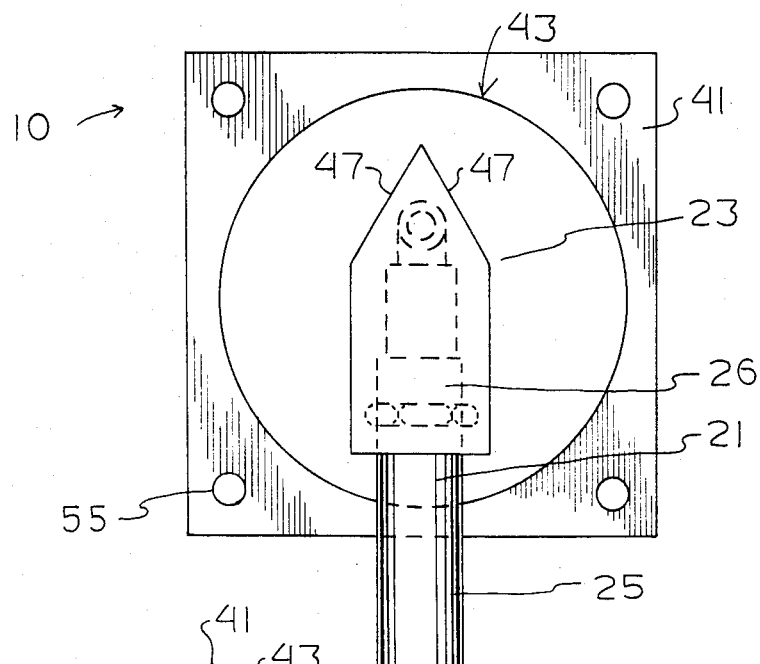
FIG. 5 is a front elevational view of a second embodiment of the invention.
Figure 6:
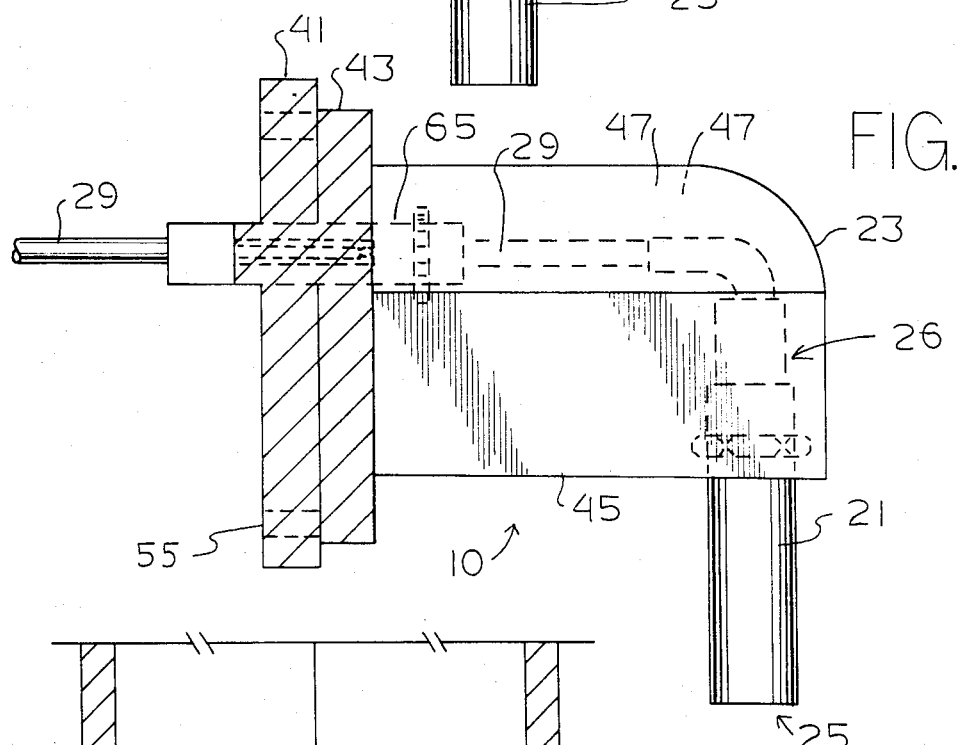
FIG. 6 is a side elevational view of the apparatus shown in FIG. 5.

A second embodiment of the protected sensor 10 is illustrated in FIGS. 5 and 6 wherein like parts have been indicated with like reference numerals. In this embodiment of the invention the protective housing 23 has been constructed without the fillets 44 and sensing terminal sleeve 49 included in the embodiment shown in FIGS. 1-4. If fabricated from the appropriate material, the protective housing can be made strong enough to withstand the impact of flowing granular material without the need for the fillets. Also, while the use of a sensing terminal sleeve can considerably extend the life of a capacitive proximity sensor, adequate life may be obtained without it.

Also included in the second embodiment of the protected sensor 10 is a standard electrical jack 65 that allows for easy disassociation of the remote control circuitry 27 from the sensing terminal 21. This permits the replacement of a non-functioning protected sensor with a minimum of downtime.

It should be understood that although certain preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the invention are set forth in the following claims.

What is claimed is:

1. Sensing apparatus for detecting the presence of grain at a predetermined location in a container adapted to store grain and in a conduit to contain the flow of grain from an upstream to a downstream direction, said sensing apparatus comprising:

a capacitive proximity sensor having a sensing terminal extending from the upstream direction to the downstream direction having an upstream portion and a downstream portion, said sensor adapted to exhibit a change in its capacitance as said downstream portion changes its communication from said grain;

circuit means for measuring the change in capacitance operatively associated with the capacitive proximity sensor;

a molded abrasion resistant plastic protective housing including a spacing arm substantially transverse to said sensing terminal and at least one material deflecting surface facing the upstream direction;

the upstream portion of the capacitive proximity sensor embedded in the molded protective housing and the downstream portion of said sensor extending from and outside said protective housing opposite the material deflecting surface;

said protective housing being larger and surrounding said upstream portion of said sensor, said housing allowing grain and flowing grain to be adjacent to said sensor to detect the presence of grain and flow thereof;

a mounting flange for securing the protective housing to said container, said flange and said spacing arm orienting said capacitive proximity sensor relative to the flow of grain and container so that the grain is diverted away from the downstream portion of the capacitive proximity sensor by said material deflecting surface and said container does not substantially affect the capacitance of the capacitive proximity sensor when said sensor is secured in said predetermined orientation.

2. Apparatus in accordance with claim 1 wherein the downstream portion of the capacitive proximity sensor extends between about ½ to about ¾ inch from said protective housing.

3. Apparatus in accordance with claim 2 wherein said protective housing is molded urethane.

4. Apparatus in accordance with claim 3 wherein said sensing terminal is about 6 inches from a wall of said container.

* * * * *